United States Patent Office 2,819,952
Patented Jan. 14, 1958

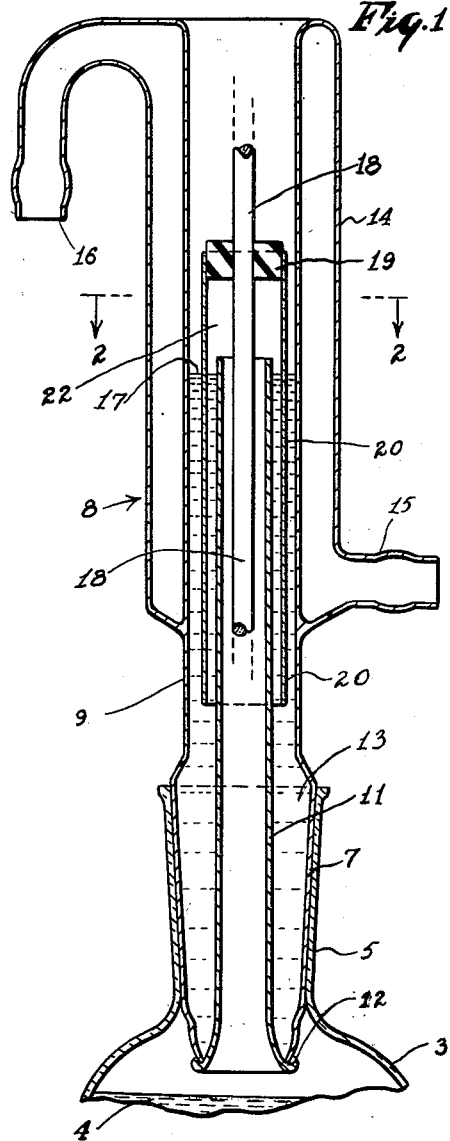

2,819,952

LIQUID-COOLED SEAL

Meier E. Freed, Philadelphia, Pa., assignor to American Home Products Corporation, New York, N. Y., a corporation of Delaware Application June 1, 1954, Serial No. 433,468

2 Claims. (Cl. 23—292)

This invention relates to a new and improved liquid-cooled seal especially useful where an element, such as a stirring rod, extends into a vessel wherein materials are subjected to heating and/or distillation.

In chemical laboratory operations, particularly where heating and distillation are carried out in closed vessels from which the air is excluded, it is frequently necessary to provide means by which the material being heated and refluxed may be stirred. Preliminary stirring, or simultaneous stirring and refluxing, of a reaction mixture, or of a solvent, must be carried out without the escape of vapor and under circumstances wherein contact with the outside air is avoided.

It is customary to use a sealing liquid to prevent the escape of vapors and access of air to the material being heated in a vessel, and various sealants such as mercury, oils, silicone fluids, and other liquids are now commonly used for the purpose. However, in the conventional type of liquid seals, the sealing liquid (or sealant) soon becomes warm, with the result that solvent is lost and the liquid contaminated. With many organic solvents the fire hazard is greatly increased by the resulting escape of inflammable vapor, especially where an electric motor is used to operate the stirring rod.

It is a primary object of this invention to provide an effective vapor seal for use in conjunction with a distillation vessel or apparatus which permits the extension of a stirring rod or similar element into the liquid or mixture being heated or refluxed, which seal is effectively cooled by means of a cooling jacket through which a cooling liquid flows. In this way solvent vapors which would normally escape into the atmosphere are condensed and fall back into the heating vessel.

My improved seal, including a cooling jacket, may be utilized both with seals using a liquid sealant such as mercury, and in seals in which no liquid sealant is employed. When a seal having a liquid sealant such as mercury is utilized, contamination of the sealant by condensation of solvent vapors therein is avoided.

It is a further object of this invention to provide a liquid-cooled vapor seal of this type which, when used in conjunction with a sealant such as mercury, or other inert liquid, avoids the difficulties experienced with ordinary liquid seals whose usefulness is rapidly destroyed by heating up of the mercury (or other sealant utilized).

Another object of my invention is to provide a seal for a stirring rod or similar element which extends into a heating vessel or distillation apparatus holding a liquid which is being refluxed, which seal avoids the use of any liquid sealant whatever, but wherein escape of vapors of the volatilized liquid is effectively prevented by their condensation, a cooling jacket for this purpose being provided around or in close juxtaposition to the seal.

My invention can best be described in connection with the annexed drawing showing certain preferred embodiments of my improved seal. In this drawing, Fig. 1 is a vertical sectional view of one form of my improved device employing a cooled body of liquid as the sealing liquid;

Fig. 2 is a cross-sectional view taken on the line 2—2 of Fig. 1;

Fig. 3 is a view, partly in section and partly in elevation, showing the inverted cup seal extending into the sealing liquid, and the stirring rod which extends into the distillation vessel whose contents are to be stirred; and Fig. 4 is a vertical sectional view of a modified form of my improved seal wherein no sealing liquid is required.

With particular reference to the embodiment of my invention shown in Figures 1 to 3, the vessel 3 in which the liquid reaction mixture or solvent 4 is heated to reflux, herein called a distillation apparatus, is provided with a ground glass joint 5 into which the ground lower portion 7 of my improved liquid-cooled seal 8 securely seats. This joint, and the improved seal of the liquid type fitting into it and extending thereabove, serve to prevent escape of vapors of the volatilized solvent, and also to prevent access of air to the liquid or reaction mixture which is being heated.

The seal 8 includes the outer tubular member 9 and the inner cylindrical member or sleeve 11, which is open at its upper end, but is sealed at 12 to the outer tubular member 9 at its lower end. There is thus provided between the inner cylindrical member and outer tubular member a space 13, which serves as a receptacle or reservoir for the sealing liquid, which sealant may be mercury, a heavy oil, a silicone fluid, or other liquid now commonly used wherever a liquid seal is needed.

For convenience the inner sleeve 11 is shown as cylindrical in form (except where it flares outwardly at its base where it is joined ot the outer tube 9 at 12). Similarly, the outer tube 9 is also shown as generally cylindrical in form. However there is no reason why some other shape could not be used for these parts, as they could easily be oval, elliptical or rectangular in cross-section, or be formed in any other convenient shape.

The upper portion of the outer tubular member 9 is provided with a cooling jacket 14, having an inlet 15 and an exit 16 for the cooling liquid. Water, brine, or any other suitable cooling liquid may be circulated through the cooling jacket, which extends around the upper portion of the body of sealant 13, as well as above this liquid (the upper surface of which is indicated at 17). The entire volume of the sealing liquid, as well as the vapor spaces in the apparatus adjacent thereto, are thus effectively cooled.

The stirring rod 18 extends through a tight fitting sleeve 19 in which it is securely held. At its lower extremity the rod 18 is provided with standard stirrer blades (not shown), which may be of any well-known type, such as propeller type, half-moon, Hirschberg, etc. The sleeve 19 may be made of rubber, or of some synthetic rubber-like material. Teflon (a du Pont tetrafluoroethylene resin) has been found very satisfactory.

The sleeve 19 through which the stirring rod 18 extends fits tightly into the open end of the inverted cup seal cylinder 20, thus providing an inverted cup seal which extends into the liquid sealant space 13 between the outer tubular member 9 and the inner cylindrical member 11 of the seal 8. The rod 18, inverted cup seal 20, and the stirrer on the end of the rod (not shown) rotate as single unit, power being supplied by a stirrer motor (not shown) to which the upper end of the rod 18 is attached and by which the rod and cup seal are suspended. The cylinder 20 rotates in the sealing liquid 13. The contents 4 of the distillation apparatus 3 are thus effectively stirred.

The flexible nature of the sleeve 19 allows the cup seal 20 to be pushed vertically up and down, as desired, and it should be so adjusted that the lower surface of the sleeve 19 is not in contact with the upper open end of the inner cylindrical member 11. Otherwise undesirable friction would occur, causing heating and wear on the lower surface of the sleeve 19.

In operation, as the liquid 4 in the distillation apparatus 3 is volatilized upwardly into the space 22 surrounding the stirring rod 8 within the cup seal 20, escape of vapor is prevented by its condensation. This is effected by the cooling jacket 14, through which the cooling liquid circulates, thus cooling and causing vapor condensation in the space 22. At the same time the body of sealant 13 is also cooled, thus preventing escape of volatilized solvent and contamination of the sealant, both of which occur in conventional types of apparatus wherein no provision is made for cooling the liquid seal. The condensate falls back into the vessel 3.

In the embodiment of my inveniton shown in Fig. 4 the liquid seal 13 of the first form of my invention is replaced by a ground ball and socket joint. As in the first embodiment, the cooling jacket 14, having inlet 15 and exit 16 for the circulating cooling liquid, cools the vapor space 30 surrounding the stirrer rod 18 and prevents hot vapor from coming into contact with the abutting surfaces forming the ball and socket joint seal.

The apparatus shown in Fig. 4 is adapted to fit into the ground glass joint 5 of a distillation apparatus 3, and be supported thereby, exactly as in the embodiment of my invention shown in Figs. 1 to 3. Identical numerals indicate like parts in the two forms of the invention. Thus, stirring rod 18 extends through the inner cylindrical member 11, joined at 12 to the outer tubular member 9. At the lower end of the stirring rod there is a standard stirrer blade or blades (not shown), which extend into and stir the contents 4 of the distillation apparatus 3.

In place of the liquid seal 13 of the first embodiment, however, there is provided a ball and socket joint seal above the cooling jacket 14. This includes a socket joint 24, having ground contacting surface 25, extending from the seal 8. As shown, this may be an extension of the outer tubular member 9 with its cooling jacket 14, or it may be a separate element, joined thereto. The ball portion 26 of the joint seats on the ground surface 25 of the socket 24, and contacting surface areas of the ball 26 are carefully ground to insure a tight seal.

The hollow ball 26 is preferably formed with an upwardly extending tubular stem 27, the outer open end of which is closed by a sleeve 28 of rubber, synthetic rubber, Teflon, or other similar elastic material. The stirring rod 18 extends through this sleeve 28, its outer end being operatively connected to and supported by a stirring motor (not shown). An aperture 29 is provided in the non-contacting portion of the periphery of the ball 26. The stirring rod 18 extends through the aperture 29 and the inner cylindrical member 11, its lower extremity carrying the stirrer blades (not shown) extending into the vessel 3.

The contacting surfaces of the ball and socket joint, which are carefully ground to insure a tight fit, may also have a lubricant or resinous sealing composition positioned therebetween, thus increasing the effectiveness of the seal.

The embodiment of my invention illustrated in Fig. 4 operates as follows. When the liquid 4 in the distillation apparatus or vessel 3 is volatilized, the vapors move upwardly within the inner cylindrical member 11 into the upper chamber 30 of the outer tubular member 9. This chamber is cooled by the circulating cooling liquid which flows through the cooling jacket 14. This results in condensation of the vapors, and the condensate falls back into the vessel 3. Passage of the volatilized liquid through the aperture 29 into the interior of the ball 26 is therefore prevented, since the vapor is condensed before reaching the ball and socket joint seal. Dissolving away or removal of lubricant or other soluble sealing compound from the contacting surfaces of the ball 26 and socket joint 24 is also prevented.

While both embodiments of my improved seal may be constructed in various sizes, and the dimensions of the various parts form no part of my invention, it may be noted that in a typical device the stirring rod 18 may be a solid rod approximately 6 millimeters in diameter. The inverted cup seal cylinder 20 in the form shown in Figs. 1 to 3 may be approximately 14 millimeters in diameter. The inner cylindrical member 11 may have an inside diameter of approximately 10 millimeters, and the maximum outside diameter of the outer tubular member 9 may be about 20 to 25 millimeters. The apparatus may be constructed of glass, metal, ceramic material, or of any other suitable resistant material.

Changes and modifications in my improved liquid-cooled seal, to the extent that they are within the scope of the appended claims, are intended to be considered as within the scope of my invention.

I claim:

1. A vapor seal adapted to seat in and close the outlet of a distillation apparatus, said seal comprising, in combination: an outer generally-tubular member; an inner member positioned therewithin and joined to said outer member at the base portion thereof; a ground ball and socket joint at the upper portion of said outer member, said ball and socket joint being apertured to permit the passage of a stirring rod therethrough; an open-ended tubular stem on said ball portion of said joint; a stopper positioned in the open end of said tubular stem, said stopper supporting a stirring rod which extends therethrough, and said stirring rod passing through said aperture in said ground ball and socket joint into said distillation apparatus; and cooling means surrounding said outer generally-tubular member and cooling the space therewithin, whereby vapor is condensed so that the condensate falls back into said distillation apparatus, thereby preventing its escape from said apparatus.

2. A vapor seal adapted to seat in and close an outlet of a reaction vessel or distillation apparatus, said seal comprising, in combination: an outer generally-tubular member; an inner tubular member positioned therewithin and joined to said outer member at the base portion thereof; a ground ball and socket joint at the upper portion of said outer member, said ball and socket joint being apertured to permit the passage of a stirring rod therethrough; said ball portion of said ball and socket joint being formed with a tubular extension, the outer end of which is adapted to be closed by an apertured stopper; an apertured stopper formed of a synthetic rubber-like material seated in the open end of said tubular extension, said stopper being adapted to support a stirring rod which extends through said aperture therein; a stirring rod positioned in the aperture in said stopper, said stirring rod extending through said aperture in said ground ball and socket joint into said apparatus; a tubular cooling jacket surrounding a portion of said outer generally-tubular member and providing a chamber through which a cooling liquid may flow, thus cooling the space within said outer generally-tubular member whereby vapor present therein is condensed and remains within said apparatus.

References Cited in the file of this patent

UNITED STATES PATENTS

| 343,769 | Levi | June 15, 1886 |
| 1,194,146 | Cummins | Aug. 8, 1916 |
| 1,213,494 | Ittner | Jan. 23, 1917 |
| 1,670,868 | Pierce | May 22, 1928 |

FOREIGN PATENTS

| 1,064,678 | France | Dec. 30, 1953 |